(12) United States Patent
Angel et al.

(10) Patent No.: US 7,201,552 B1
(45) Date of Patent: Apr. 10, 2007

(54) VEHICLE GAME LIFT

(76) Inventors: Tony Angel, 2297 Holyoke Dr., Boulder, CO (US) 80305; Roger Jensen, 17689 W. 58th Dr., Golden, CO (US) 80403

( * ) Notice: Subject to any disclaimer, the term of this patent is extended or adjusted under 35 U.S.C. 154(b) by 148 days.

(21) Appl. No.: 10/935,403

(22) Filed: Sep. 7, 2004

(51) Int. Cl.
*B66C 23/44* (2006.01)
*A22B 1/00* (2006.01)

(52) U.S. Cl. .................. 414/462; 212/180; 452/187

(58) Field of Classification Search .............. 414/462, 414/275, 550; 452/128; 212/180, 199, 204, 212/273; 224/519
See application file for complete search history.

(56) References Cited

U.S. PATENT DOCUMENTS

| 4,806,063 | A | * | 2/1989 | York ........................... 414/462 |
| 5,211,601 | A | * | 5/1993 | Cope .......................... 452/187 |
| 5,520,498 | A | * | 5/1996 | DiBartolomeo ............. 414/680 |
| D376,885 | S | * | 12/1996 | Carey et al. ................. D34/28 |
| 5,662,451 | A | * | 9/1997 | Muzzi et al. ............... 414/540 |
| 5,788,095 | A | * | 8/1998 | Watson ....................... 212/180 |
| 5,791,858 | A | * | 8/1998 | Sasser ......................... 414/462 |
| 6,089,431 | A | * | 7/2000 | Heyworth ................... 224/521 |
| 6,109,855 | A | * | 8/2000 | Vela-Cuellar ............... 414/462 |
| 6,138,991 | A | * | 10/2000 | Myers, Jr. ................... 254/323 |
| 6,152,675 | A | * | 11/2000 | Compton ..................... 414/543 |
| 6,155,771 | A | * | 12/2000 | Montz ......................... 414/543 |
| 6,189,866 | B1 | * | 2/2001 | Harkins et al. ............. 254/332 |
| 6,202,868 | B1 | * | 3/2001 | Murray ........................ 212/294 |
| 6,250,483 | B1 | * | 6/2001 | Frommer ..................... 212/180 |
| 6,599,078 | B1 | * | 7/2003 | Elder .......................... 414/542 |
| 6,705,821 | B2 | * | 3/2004 | Philipps et al. ............. 414/462 |
| 6,821,075 | B2 | * | 11/2004 | van der Horn .............. 414/462 |
| 6,889,779 | B2 | * | 5/2005 | Skarlupka et al. .......... 173/184 |
| 6,921,007 | B1 | * | 7/2005 | Guerrant ..................... 224/519 |
| 2002/0048504 | A1 | * | 4/2002 | Jacobs ........................ 414/541 |
| 2002/0168258 | A1 | * | 11/2002 | Philipps et al. ............. 414/462 |
| 2003/0007855 | A1 | * | 1/2003 | van der Horn .............. 414/543 |
| 2004/0214515 | A1 | * | 10/2004 | Skarlupka et al. .......... 452/128 |

OTHER PUBLICATIONS http://shop.sportsmanguide.com/cb/cb.asp?a=145631.*
http://www.younger-bros.com/Game%20Hoist%202.jpg.*

* cited by examiner

*Primary Examiner*—Patrick Mackey
*Assistant Examiner*—Charles Greenhut
(74) *Attorney, Agent, or Firm*—Edwin H. Crabtree; Ramon L. Pizarro

(57) ABSTRACT

A vehicle game lift adapted for releasable attachment to a trailer hitch mounted on a rear of a vehicle. The game lift is used for suspending a killed animal above a ground surface. The lift includes an inverted "L" shaped post having a vertical post member and a horizontal hoist arm. The hoist arm is attached to a upper portion of the vertical post member. One end of a trailer hitch tongue is adapted for attachment to a trailer hitch. An opposite end of the trailer hitch tongue is attached to a tongue collar. The tongue collar is received around a lower portion of the vertical post member. One end of a moveable horizontal suspension arm is attached to a sliding collar. The sliding collar is received around a portion of the vertical post member. An opposite end of the suspension arm is attached to a balance beam having a plurality of hooks thereon. The hooks are adapted for releasable attachment to the killed animal. A chain hoist is attached to the horizontal suspension arm and the horizontal hoist arm. The chain hoist is used for raising and lowering the suspension arm and the balanced beam when attached to the killed animal.

14 Claims, 2 Drawing Sheets

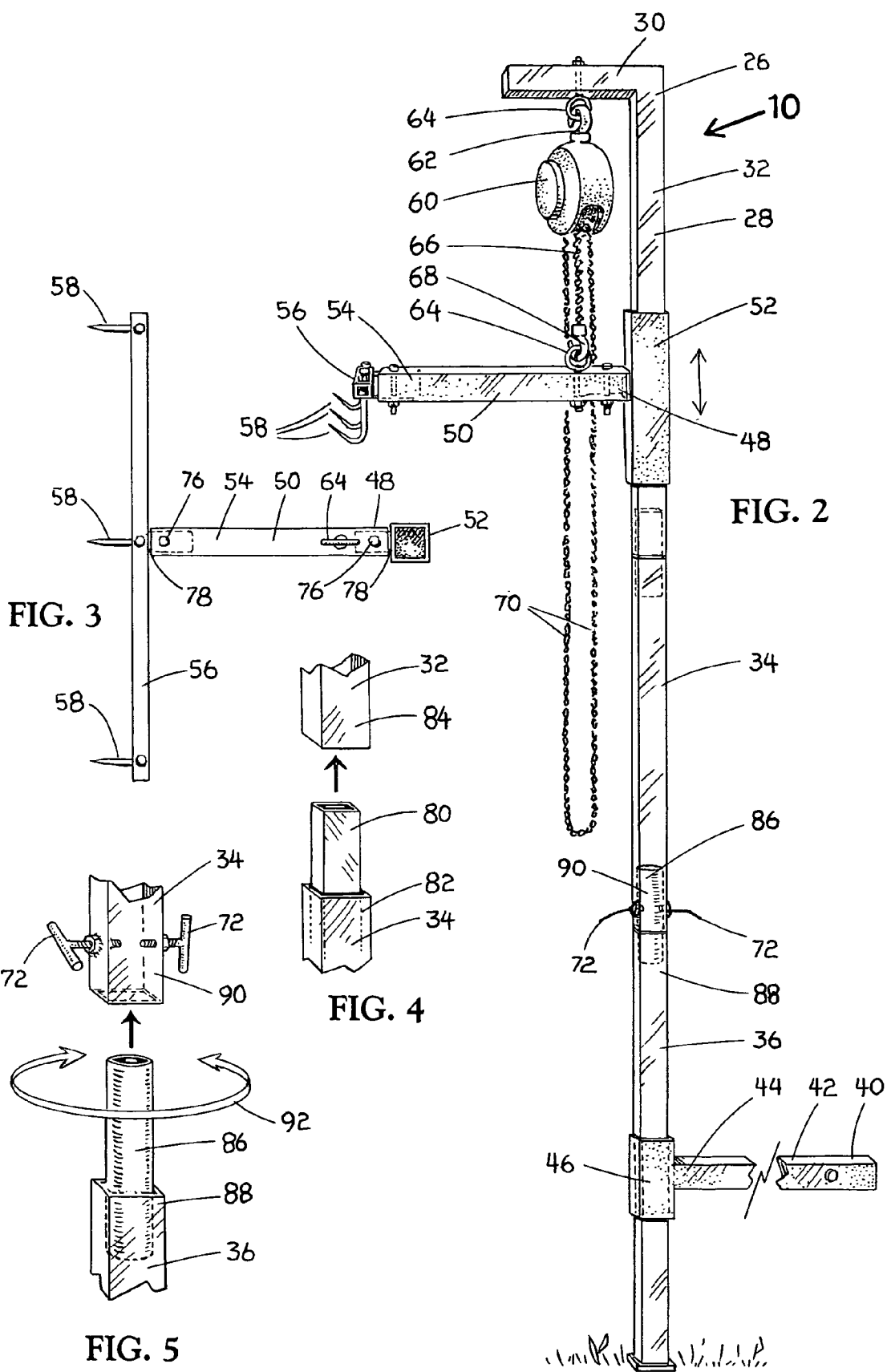

VEHICLE GAME LIFT

BACKGROUND OF THE INVENTION (a) Field of the Invention

This invention relates to a game lift or hoist for dressing game and more particularly, but not by way of limitation, to a vehicle game lift for releasable attachment to a trailer hitch mounted on a rear of a vehicle. The game lift is used when hunting game, dressing a killed animal suspended above a ground surface and lowering the dressed animal into the rear of the vehicle (b) Discussion of Prior Art Heretofore, there have been a variety of different types of game lifts and hoists. In U.S. Pat. No. 6,109,855 to Vela-Cuellar, a game hoist is disclosed for attaching to a trailer hitch at a rear of a vehicle. The game hoist includes a winch, cable, pulley and carrier with hooks for attaching to the legs of an animal. In U.S. Pat. No. 6,250,483 to Frommer and U.S. Pat. No. 5,791,858 to Sasser, similar game hoists are described and used for attaching to a rear of a vehicle. The game hoists include hand winch assemblies for raising the game above a ground surface. In U.S. Pat. No. 6,155,771 to Montz, a game hoist with rotating boom is shown and mounted on a rear of an ATV. In U.S. Pat. No. 6,152,675 to Compton, a fold-up hoist for mounting on a vehicle is described.

None of the above mentioned prior art patents specifically disclose the unique features, structure and function of the subject vehicle game lift used when dressing a killed animal and storing it in a rear of a vehicle as described herein.

SUMMARY OF THE INVENTION

In view of the foregoing, it is a primary objective of the subject invention to provide a portable and heavy-duty game lift adapted for attaching to a trailer hitch on a rear of the vehicle.

Another object of the game lift is it provides for ease and stability when lifting and dressing a killed animal above a ground surface. Also, the lift is used to rotate the dressed animal above the rear of the vehicle for lowering and storing it thereon.

Yet another object of the invention is the game lift includes a chain hoist that can lift a killed animal weighing up to 1000 pounds. The chain hoist eliminates the use of a wench with cable, which can be dangerous when lifting a heavy animal.

The vehicle game lift is adapted for releasable attachment to a trailer hitch mounted on a rear of a vehicle. The game lift is used for suspending a killed animal above a ground surface, dressing the animal and then lowering the dressed animal onto the rear of the vehicle. The lift includes an inverted "L" shaped post having a vertical post member and a horizontal hoist arm. The hoist arm is attached to a upper portion of the vertical post member. The vertical post member can be divided into two or more post sections with an upper post section rotatable on a lower post section. One end of a trailer hitch tongue is adapted for attachment to a trailer hitch. An opposite end of the trailer hitch tongue is attached to a tongue collar. The tongue collar is received around a lower portion of the vertical post member. A bottom of the vertical post member rests on top of the ground surface. One end of a moveable horizontal suspension arm is attached to a sliding collar. The sliding collar is received around a portion of the vertical post member. An opposite end of the suspension arm is attached to a balance beam having a plurality of hooks thereon. The hooks are adapted for releasable attachment to the killed animal and suspending the animal above the ground surface. A chain hoist is attached to the horizontal suspension arm and the horizontal hoist arm. The chain hoist is used for raising the suspension arm and balance beam when attached to the killed animal.

These and other objects of the present invention will become apparent to those familiar with various types of game lifts and hoists attached to vehicles when reviewing the following detailed description, showing novel construction, combination, and elements as herein described, and more particularly defined by the claims, it being understood that changes in the various embodiments of invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 2 is an enlarged side view of the game lift without the killed animal suspended therefrom.

FIG. 3 is a top view of a horizontal suspension arm and a balance beam with game hooks thereon.

FIG. 4 is a perspective view of a square tube connector used for coupling together an upper post section to a middle post section.

FIG. 5 is a perspective view of a round pivot tube connector for coupling together the middle post section to a lower post section.

DETAILED DESCRIPTION OF THE PREFERRED EMBODIMENTS

Figure 1:
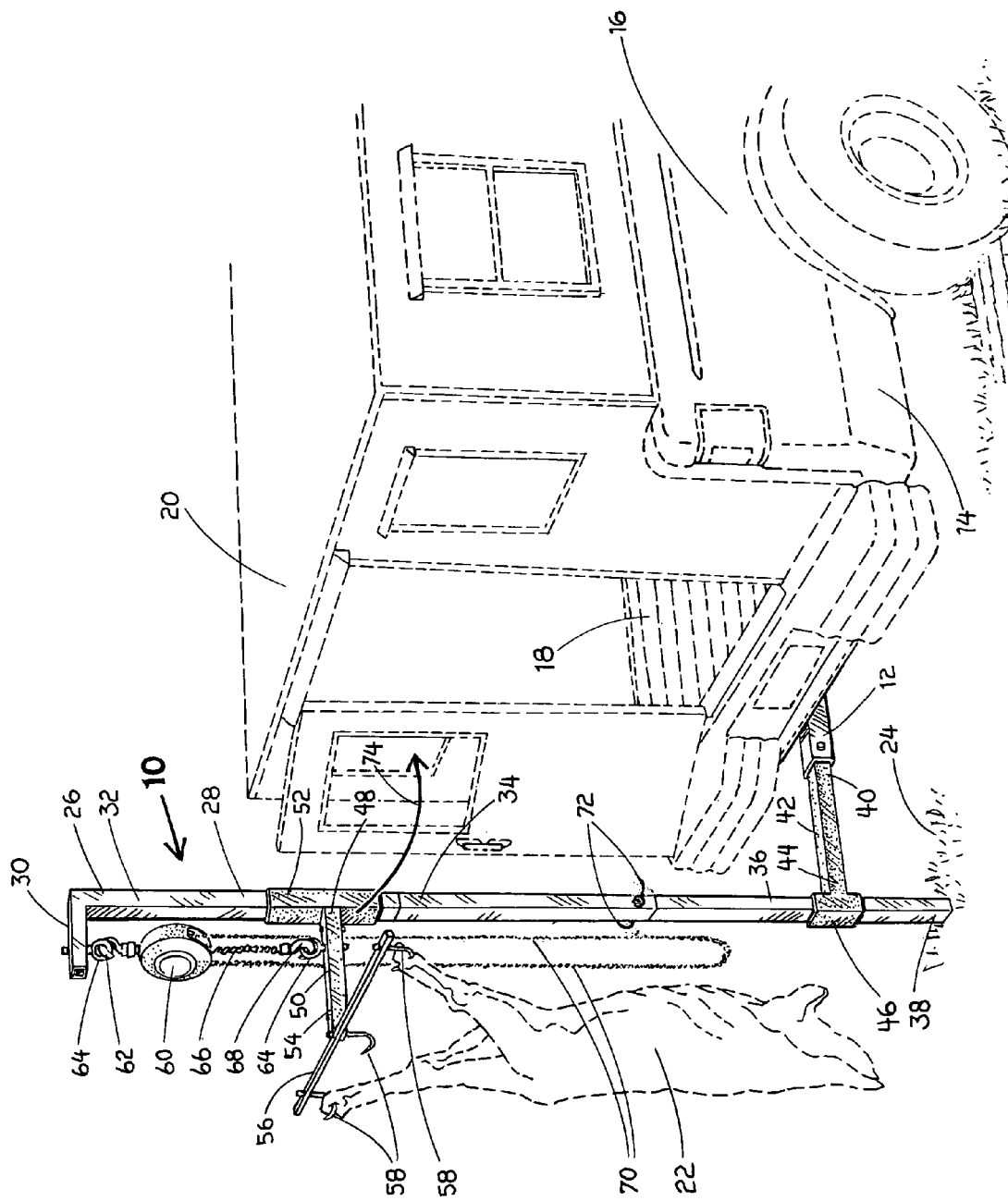
FIG. 1 is a perspective view of the subject vehicle game lift attached to a trailer hitch mounted on a rear of a vehicle. The game lift is shown suspending a dressed animal above a ground surface prior to rotating the animal above the rear of the vehicle and lowering it onto a flat bed of the vehicle.

In FIG. 1, a perspective view of the subject vehicle game lift is shown having general reference numeral 10. The vehicle game lift 10 is adapted for attachment to a trailer hitch 12 mounted on a rear 14 of a vehicle 16. In this drawing, the rear 14 of the vehicle 16 is shown having a flat bed 18 with a cover 20. The game lift 10 is shown suspending a dressed animal 22 above a ground surface 24 and prior to rotating the animal 22 above the rear 14 of the vehicle 16 and lowering it onto the flat bed 18 for storage thereon.

The game lift 10 includes an inverted "L" shaped post 26 having a vertical post member 28 and a horizontal hoist arm 30. The hoist arm 30 is attached to an upper portion of the vertical post member 28. In this drawing, the vertical post member 28 includes an upper post section 32, a middle post section 34 and a lower post section 36. A lower end 38 of the lower post section 36 rests on top of the ground surface 24 for transferring the weight of the lift 10 and the animal 22 thereon. The length of the vertical post member 28 can be in a range of 8 to 12 feet. By dividing the post member into two or more sections, it can be easily disassembled for ease in storage in the vehicle 16.

One end 40 of a trailer hitch tongue 42 is adapted for attachment to the trailer hitch 12. An opposite end 44 of the trailer hitch tongue 42 is attached to a tongue collar 46. The collar 46 is slidably received around a portion of the lower post section 36.

One end 48 of a moveable horizontal suspension arm 50 is attached to a sliding collar 52. The sliding collar 52 is received around a portion of the upper post section 32. An opposite end 54 of the suspension arm 50 is attached to a balance beam 56 having a plurality of game hooks 58 spaced apart thereon. The game hooks 58 are adapted for releasable attachment to the killed animal 22 and suspending the animal above the ground surface 24. The hooks 58 can be rotated parallel to the length of the balance beam 56 during storage.

A chain hoist 60 having an upper hook 62 is attached to a first hook ring 64 on the horizontal hoist member 30. The chain hoist 60 includes a suspension chain 66 attached to a lower hook 68. The lower hook 68 is attached to a second hook ring 64 on the horizontal suspension arm 50. By moving a height adjustment chain 70 on the chain hoist 60, the suspension arm 50 and sliding collar 52 are raised by the suspension chain 66 on the vertical post member 28 for lifting the animal 22 above the ground surface 24 for ease in dressing the animal. After the animal is dressed, a pair of set screws 72 can be loosened on the middle post section 34 and the suspension arm 50 with the balance beam 56 and attached animal 22 can be rotated, as indicated by arrow 74, for positioning the animal above the flat bed 18. At this time, the height adjustment chain 70 can be used to lower the suspension chain 66 and in turn the suspension arm 50 for lowering the dressed animal 22 on top of the flat bed 18.

In FIG. 2, an enlarged side view of the game lift 10 is shown and without the killed animal 22 suspended from the game hooks 58 on the balanced beam 56. Also, the trailer hitch tongue 42 is shown removed from the trailer hitch 12. In this drawing, the chain hoist 60 is shown having raised the suspension arm 50 and sliding collar 52 on the vertical post member 28.

In FIG. 3, a top view of the horizontal suspension arm 50 is shown with the one end 48 attached, using a threaded bolt 76 to an attachment arm 78. The attachment arm 78 extends outwardly from a side of the hollow sliding collar 52. It should be noted that the sliding collar 52 has a square cross section for receipt around a square cross section of the upper post section 32. The square cross section of the sliding collar 52 prevents the suspension arm 50 from twisting on the vertical post member 28. This angular cross sectional feature of the vertical post member 28 and the sliding collar 52 provides for added stability during the operation of the game lift 10.

In FIG. 4, a perspective view of a square tube connector 80 is shown attached to an upper end 82 of the middle post section 34. The connector 80 is used for releasably securing the middle post section 34 to a lower end 84 of the upper post section 32.

In FIG. 5, a perspective view of a round pivot tube connector 86 is shown attached to an upper end 88 of the lower post section 36. The connector 86 is used for releasably securing the lower post section 36 to a lower end 90 of the middle post section 34. As mentioned above, the middle post section 34 includes set screws 72, which are threaded through the lower end 90, for engaging a portion of the round pivot tube connector 86, as shown in FIG. 2. When the set screws 72 are loosened, the upper and middle post sections 32 and 34 are free to rotate, as indicate by arrow 92, and position the suspension arm 50 and balance beam 56 for lifting the killed animal 22 above the ground surface 24 for dressing the animal or lowering the dressed animal onto the top of the flat bed 18.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A vehicle game lift adapted for releasable attachment to a trailer hitch mounted on a rear of a vehicle, the game lift used for suspending a killed animal above a ground surface, dressing the animal and then lowering the dressed animal onto a flat bed at the rear of the vehicle, the game lift comprising:

an inverted "L" shaped post having a vertical post member and a horizontal hoist arm, said hoist arm attached to an upper portion of said vertical post member;

a trailer hitch tongue having one end adapted for attachment to the trailer hitch, an opposite end of said trailer hitch tongue attached to a tongue collar, said tongue collar received around a lower portion of said vertical post member, a bottom of said vertical post member adapted for resting on top of the ground surface;

a moveable horizontal suspension arm having one end attached to a sliding collar, said sliding collar received around a portion of said vertical post member;

a balance beam having a plurality of hooks thereon, said hooks adapted for releasable attachment to the killed animal and suspending the animal above the ground surface, an opposite end of said suspension arm attached to said balance beam; and a chain hoist attached between said horizontal suspension arm and said horizontal hoist arm, said chain hoist used for raising and lowering said suspension arm and said balance beam.

2. The game lift as described in claim 1 wherein said vertical post member is divided into an upper post section and a lower post section, said upper post section rotatable on said lower post section for rotating said suspension arm and said balance beam thereon.

3. The game lift as described in claim 1 wherein said vertical post member is divided into an upper post section, middle post section and a lower post section, said upper post section and said middle post section rotatable on said lower post section for rotating said suspension arm and said balance beam hereon.

4. The game lift as described in claim 1 wherein said vertical post member has a square hollow cross section and said sliding collar has a square hollow cross section for receipt around said vertical post member.

5. The game lift as described in claim 1 wherein said chain hoist includes a upper hook releasably attached to a first hook ring on said horizontal hoist member, said chain hoist further including a suspension chain attached to a lower hook, said lower hook releasably attached to a second hook ring on said suspension arm, said chain hoist including a height adjustment chain for raising and lower said suspension chain and in turn raising and lowering said suspension arm.

6. A vehicle game lift adapted for releasable attachment to a trailer hitch mounted on a mar of a vehicle, the game lift used for suspending a killed animal above a ground surface, dressing the animal and then lowering the dressed anal onto a flat bed at the rear of the vehicle, the game lift comprising:

an inverted "L" shaped post having a vertical post member and a horizontal hoist arm, said hoist arm attached to an upper portion of said vertical post member, said vertical post member having a square hollow cross section;

a trailer hitch tongue having one end adapted for attachment to the trailer hitch, an opposite end of said trailer hitch tongue attached to a tongue collar, said tongue collar having a hollow square cross section, said tongue collar received around a lower portion of said vertical post member, a bottom of said vertical post member adapted for resting on top of the ground surface;

a moveable horizontal suspension arm having one end attached to a sliding collar, said sliding collar having a hollow square cross section, said sliding collar received around a portion of said vertical post member;

a balance beam having a plurality of spaced apart hooks thereon, said hooks adapted for releasable attachment to the killed animal and suspending the animal above the ground surface, an opposite end of said suspension arm attached to said balance beam; and a chain hoist is attached between said horizontal suspension arm and said horizontal hoist arm, said chain hoist is used for raising and lowering said suspension arm and said balance beam.

7. The game lift as described in claim 6 wherein said vertical post member is divided into an upper post section and a lower post section coupled together using a round pivot tube connector for rotating said upper post section on said lower post section and in turn rotating said suspension arm and said balance beam thereon.

8. The game lift as described in claim 6 wherein said vertical post member is divided into an upper post section, middle post section and a lower post section, said upper post section and said middle post section coupled together using a square tube connector, said middle post section and said lower post section coupled together using a round pivot tube connector for rotating said middle post section and said upper post section and in turn rotating said suspension arm and said balance beam.

9. The game lift as described in claim 8 further including a set screw treaded into a portion of said middle post section and engaging said round pivot tube connector for loosening and tightening said middle post section on said lower post member.

10. The game lift as described in claim 6 wherein said chain hoist includes a upper hook releasably attached to a first hook ring on said horizontal hoist member, said chain hoist further including a suspension chain attached to a lower hook, said lower hook releasably attached to a second hook ring on said suspension arm, said chain hoist having a height adjustment chain for raising and lowering said suspension chain and in turn raising and lowering said suspension arm and said balance beam.

11. A vehicle game lift adapted for releasable attachment to a trailer hitch mounted on a rear of a vehicle, the game lift used for suspending a killed animal above a ground surface, dressing the animal and then lowering the dressed animal onto a flat bed at the rear of the vehicle, the game lift comprising:

an inverted "L" shaped post having a vertical post member and a horizontal hoist arm, said hoist arm attached to an upper portion of said vertical post member, said vertical post member having a square hollow cross section, said vertical post member divided into a upper post section, a middle post section and a lower post section, said upper and middle post section pivotally attached to said lower post section;

a trailer hitch tongue having one end adapted for attachment to the trailer hitch, an opposite end of said trailer hitch tongue attached to a tongue collar, said tongue collar having a hollow square cross section, said tongue collar received around a lower portion of said lower post section, a bottom of said lower post section adapted for resting on top of the ground surface;

a moveable horizontal suspension arm having one end attached to a sliding collar, said sliding collar having a hollow square cross section, said sliding collar received around a portion of said upper post section;

a balance beam having a plurality of spaced apart hooks thereon, said hooks adapted for releasable attachment to the killed animal and suspending the animal above the ground surface, an opposite end of said suspension arm attached to said balance beam; and a chain hoist attached between said horizontal suspension arm and said horizontal hoist arm, said chain hoist used for raising and lowering said suspension arm and said balance beam.

12. The game lift as described in claim 11 wherein said upper post section and said middle post section are coupled together using a square tube connector and said middle post section and said lower post section are coupled together using a round pivot tube connector for rotating said middle post section and said upper post section on said lower post section.

13. The game lift as described in claim 11 further including a pair of set screws threaded into a portion of said middle post section and engaging said round pivot tube connector for loosening and tightening said middle post section on said lower post section.

14. The game lift as described in claim 11 wherein said chain hoist includes a upper hook releasably attached to a first hook ring on said horizontal hoist member, said chain hoist further including a suspension chain attached to a lower hook, said lower book releasably attached to a second hook ring on said suspension arm, said chain hoist having a height adjustment chain for raising and lowering said suspension chain and in turn raising and lowering said suspension arm and said balance beam.

* * * * *

UNITED STATES PATENT AND TRADEMARK OFFICE
CERTIFICATE OF CORRECTION

| | |
|---|---|
| PATENT NO. | : 7,201,552 B1 |
| APPLICATION NO. | : 10/935403 |
| DATED | : April 10, 2007 |
| INVENTOR(S) | : Angelo et al. |

It is certified that error appears in the above-identified patent and that said Letters Patent is hereby corrected as shown below:

Title page, Item (12) and (75) delete "Angel et al." replace with --Angelo et al.--.

This certificate supersedes the Certificate of Correction issued June 17, 2008.

Signed and Sealed this

Twenty-second Day of July, 2008

JON W. DUDAS
*Director of the United States Patent and Trademark Office*